US008233167B2

(12) United States Patent
Ito

(10) Patent No.: US 8,233,167 B2
(45) Date of Patent: Jul. 31, 2012

(54) IMAGE FORMING DEVICE

(75) Inventor: Sakae Ito, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 382 days.

(21) Appl. No.: 12/719,882

(22) Filed: Mar. 9, 2010

(65) Prior Publication Data

US 2010/0302570 A1 Dec. 2, 2010

(30) Foreign Application Priority Data

May 27, 2009 (JP) ................................ 2009-127825

(51) Int. Cl.
*G06F 15/00* (2006.01)
*G03G 15/00* (2006.01)

(52) U.S. Cl. ...................................... 358/1.13; 399/408

(58) Field of Classification Search .................. 358/1.13
See application file for complete search history.

(56) References Cited

U.S. PATENT DOCUMENTS 8,081,331 B2 * 12/2011 Sekiya et al. ................ 358/1.15
2006/0088336 A1 4/2006 Hirose et al.
2008/0279585 A1 11/2008 Furuichi et al.

FOREIGN PATENT DOCUMENTS

JP 2006-119474 5/2006
JP 2008-131620 6/2008
JP 2008-281818 11/2008

* cited by examiner

*Primary Examiner* — Saeid Ebrahimi Dehkordy
(74) *Attorney, Agent, or Firm* — Banner & Witcoff, Ltd.

(57) ABSTRACT

An image forming device includes a scanner swingable between a closed position to close an upper side of a catch tray of a printer and an opened position to open the upper side of the catch tray, a positioning mechanism having a protruding section formed at one of the printer and the scanner and a recessed section formed at the other such that the protruding section is fitted thereinto in the closed position, and a lock mechanism configured with an engagement hole formed at one of the protruding section and the recessed section and an engagement portion formed at the other so as to hold the closed position by engagement therebetween. When the scanner is swung to the closed position, a contact portion of the protruding section contacts a contact portion of the recessed section before the engagement portion contacts the engagement hole or a region around the engagement hole.

11 Claims, 10 Drawing Sheets

IMAGE FORMING DEVICE

CROSS-REFERENCE TO RELATED APPLICATION

This application claims priority under 35 U.S.C. §119 from Japanese Patent Application No. 2009-127825 filed on May 27, 2009. The entire subject matter of the application is incorporated herein by reference.

BACKGROUND

1. Technical Field

The following description relates to one or more image forming devices having a scanning unit swingably attached thereto above a printing unit.

2. Related Art

As an example of image forming devices with a scanning unit swingably attached thereto above a printing unit, an image forming device has been known which has a dome-shaped positioning section for positioning the scanning unit relative to the printing unit and a lock member for preventing the scanning unit from being swung so as to be opened when a user operates the scanning unit (e.g., see Japanese Patent Provisional Publication No. 2006-119474).

SUMMARY

According to the aforementioned image forming device, however, when the scanning unit is closed, the lock member collides against the positioning section, and thus might be damaged due to a shock accompanying the collision.

Aspects of the present invention are advantageous to provide one or more improved techniques, for an image forming device with a scanning unit swingably attached thereto above a printing unit, which make it possible to prevent an engagement member such as the lock member from being damaged.

According to aspects of the present invention, an image forming device is provided, which includes a printer configured to form an image on a recording sheet and eject, onto a catch tray thereof, the recording sheet on which the image is formed, a scanner configured to read an image on a document sheet, the scanner being swingable around a swing central axis relative to the printer between a closed position to close and cover an upper side of the catch tray and an opened position to open the upper side of the catch tray, a positioning mechanism including a protruding section formed at one of the printer and the scanner so as to protrude in a protruding direction, and a recessed section formed at a different one of the printer and the scanner so as to be recessed in a recessed direction, the protruding section being configured to be fitted into the recessed section when the scanner is in the closed position, a lock mechanism including an engagement hole formed at one of a distal end of the protruding section and a bottom of the recessed section, and an engagement portion formed at a different one of the distal end of the protruding section and the bottom of the recessed section, the engagement hole and the engagement portion being configured to hold the closed position of the scanner by engagement therebetween, a first contact portion provided to the protruding section, and a second contact portion provided to the recessed section. The first contact portion is configured to, when the scanner is swung from the opened position to the closed position, come into contact with the second contact portion before the engagement portion contacts the engagement hole or a region around the engagement hole.

According to aspects of the present invention, further provided is an image forming device that includes a printer configured to form an image on a recording sheet and eject, onto a catch tray thereof, the recording sheet on which the image is formed, a scanner configured to read an image on a document sheet, the scanner being swingable relative to the printer around a swing central axis disposed lower than a lower end of the protruding section, between a closed position to close and cover an upper side of the catch tray and an opened position to open the upper side of the catch tray, a positioning mechanism that includes a protruding section formed at the printer so as to protrude in a protruding direction, and a recessed section formed at the scanner so as to be recessed in a recessed direction, the protruding section being configured to be fitted into the recessed section when the scanner is in the closed position, a lock mechanism that includes an engagement hole formed at a distal end of the protruding section, and an engagement portion formed at a bottom of the recessed section, the engagement hole and the engagement portion being configured to hold the closed position of the scanner by engagement therebetween, a first contact portion provided to an outer side wall of the protruding section, the outer side wall being formed in a rotational symmetry shape with respect to a central axis parallel to the protruding direction, and a second contact portion provided to an inner side wall of the recessed section, the inner side wall being formed in a rotational symmetry shape with respect to a central axis parallel to the recessed direction. Each of the first contact portion and the second contact portion is formed in an arc shape with a predetermined radius around the swing central axis of the scanner when viewed in a direction parallel to the swing central axis. The first contact portion is configured to, when the scanner is swung from the opened position to the closed position, come into contact with the second contact portion before the engagement portion contacts the engagement hole or a region around the engagement hole.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompany drawings.

1. Configuration of Image Forming Device

Figure 1:
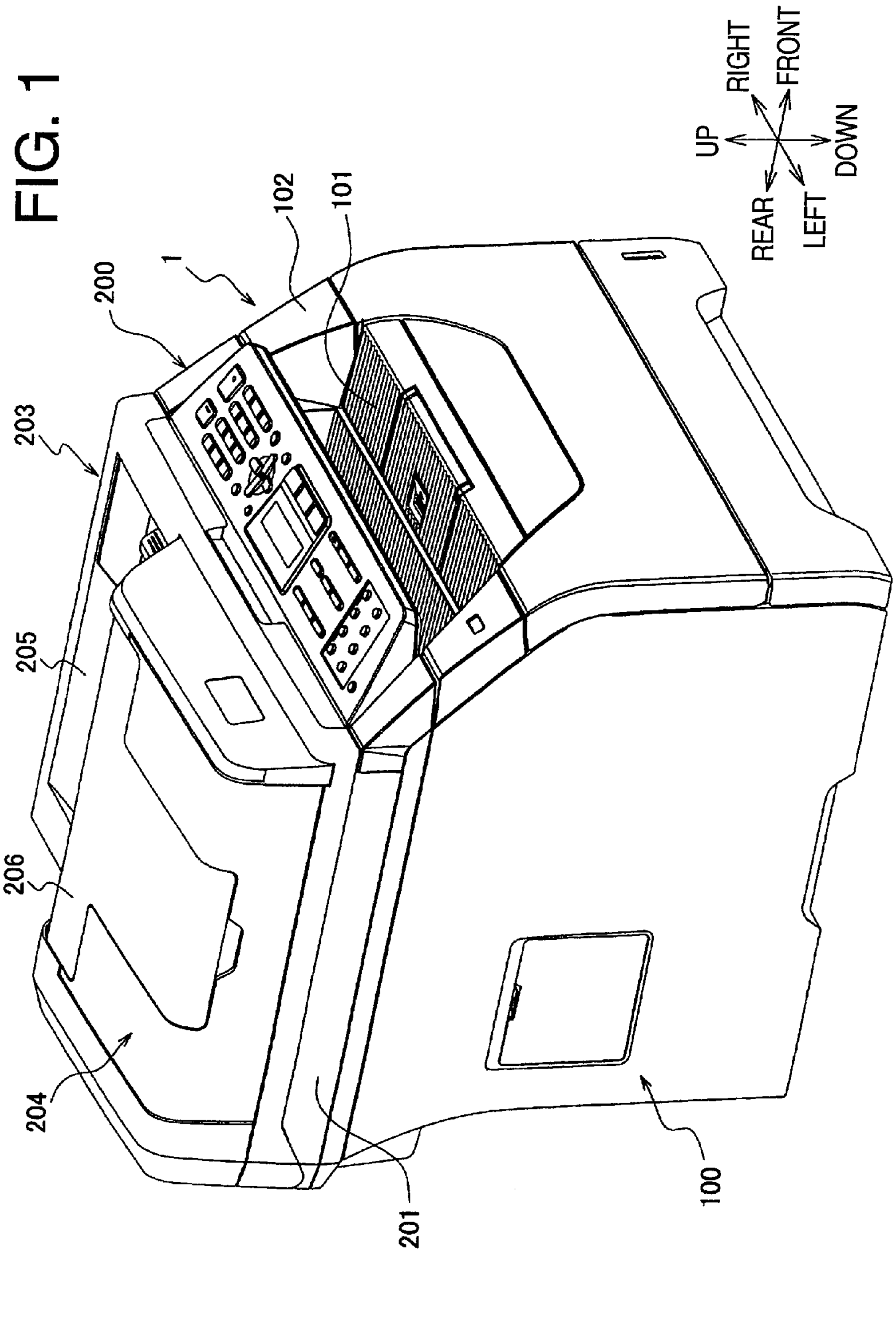
FIG. 1 is a perspective view showing an external configuration of an image forming device in an embodiment according to one or more aspects of the present invention.

As illustrated in FIG. 1, an image forming device 1 of the embodiment includes a printing unit 100 configured to form an image on a printing sheet, and a scanning unit 200 that is provided above the printing unit and configured to read an image on a document sheet.

The printing unit 100 is an electrophotographic image forming device that forms an image on a sheet by transferring a developing agent onto the sheet. The printing unit 100 has a top cover 102 that covers the upper side of the printing unit 100 and a catch tray 101 onto which a sheet is ejected with an image formed thereon by the printing unit 100.

Figure 2:
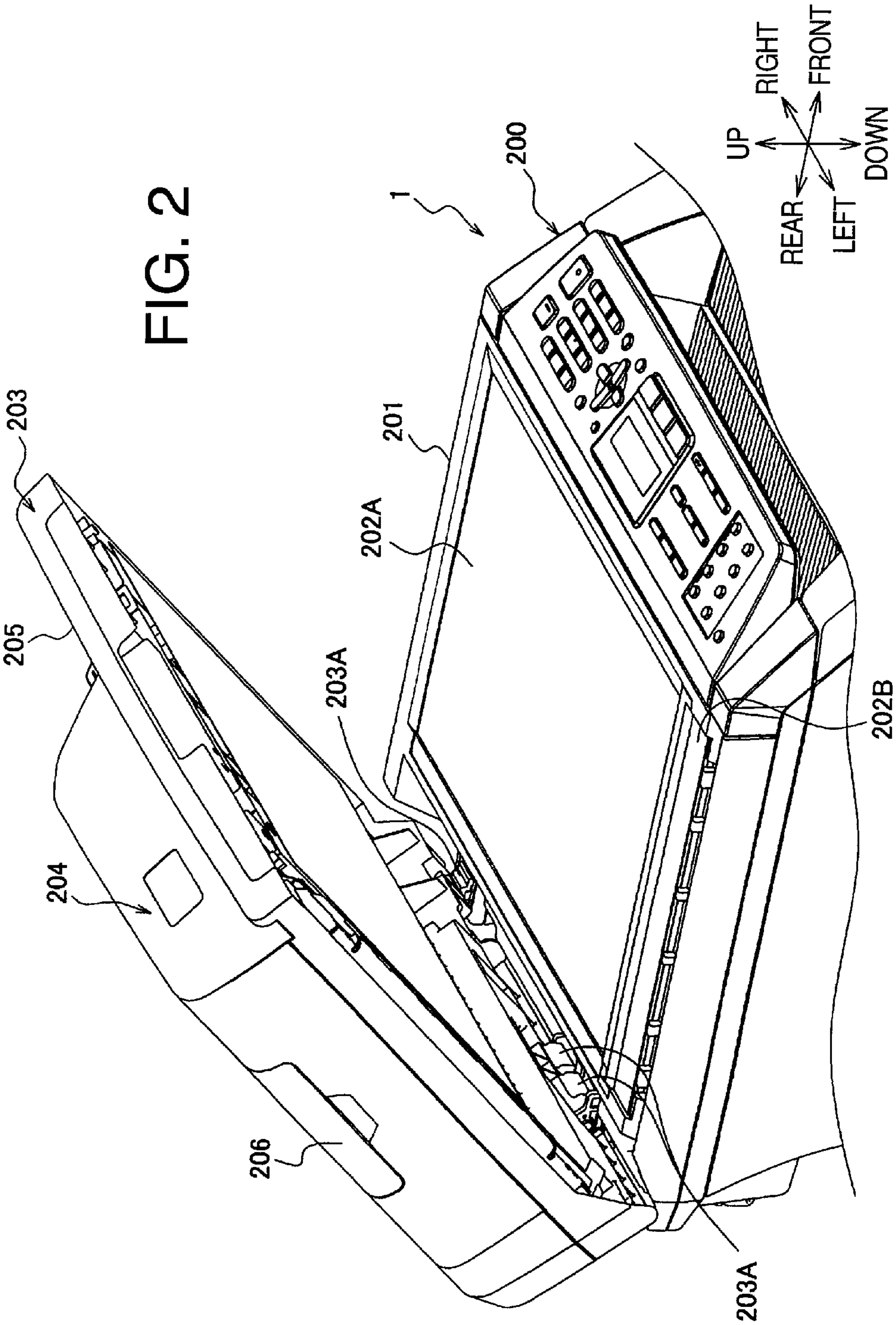
FIG. 2 is a perspective view showing a partial configuration of the image forming device in a state where a document cover thereof is opened in the embodiment according to one or more aspects of the present invention.

In addition, the scanning unit 200 is provided with a static-document reading function (flat bed reading function) for reading a statically-placed document sheet and an automatically-fed-document reading function (ADF reading function) for reading an automatically-fed document sheet. Further, the scanning unit 200 includes a document table 201 which is provided with a first reading window 202A for the static-document reading function and a second reading window 202B for the automatically-fed-document reading function, as illustrated in FIG. 2.

Further, the scanning unit 200 has a document cover 203 attached to the upper side of the document table 201 via hinges 203A. The document cover 203 is swingable between a first position and a second position. In the first position, the document cover 203 covers the first reading window 202A from the upper side of the first reading window 202A (a state shown in FIG. 1). In the second position, the upper side of the first reading window 202A is opened (a state shown in FIG. 2). In order to perform document reading using the static-document reading function, a user is required to manually open the document cover 203 up and place a document sheet on the first reading window 202A.

Under the first reading window 202A, there is an imaging device (not shown) disposed that receives light reflected by the document sheet and generates electrical signals based on the received light. The scanning unit 200 is configured to read an image while converting the image (e.g., characters) on the document sheet via the imaging device into the electrical signals.

The imaging device is attached to the document table 201 movably in a longitudinal direction of the document table 201 (in the left-to-right direction defined in the embodiment). When operated with the automatically-fed-document reading function, the imaging device reads an image of a document sheet which is passing over the second reading window 202B for the automatically-fed-document reading function in a state where the imaging device stops beneath the second reading window 202B. Meanwhile, when operated with the static-document reading function, the imaging device reads an image of a document sheet placed on the first reading window 202A while moving beneath the first reading window 202A.

To a portion, of the document cover 203, which corresponds to the second reading window 202B, a document feeding mechanism (an automatic document feeder) 204 for automatically feeding document sheets is provided as shown in FIG. 1. The document feeding mechanism 204 automatically feeds document sheets, which are stacked on a document tray 205 disposed at the upper side of the document cover 203, toward the second reading window 202B on a sheet-by-sheet basis. Then, the document feeding mechanism 204 automatically ejects sheets completely read, onto an ejection tray 206 disposed above the document tray 205.

Figure 3:
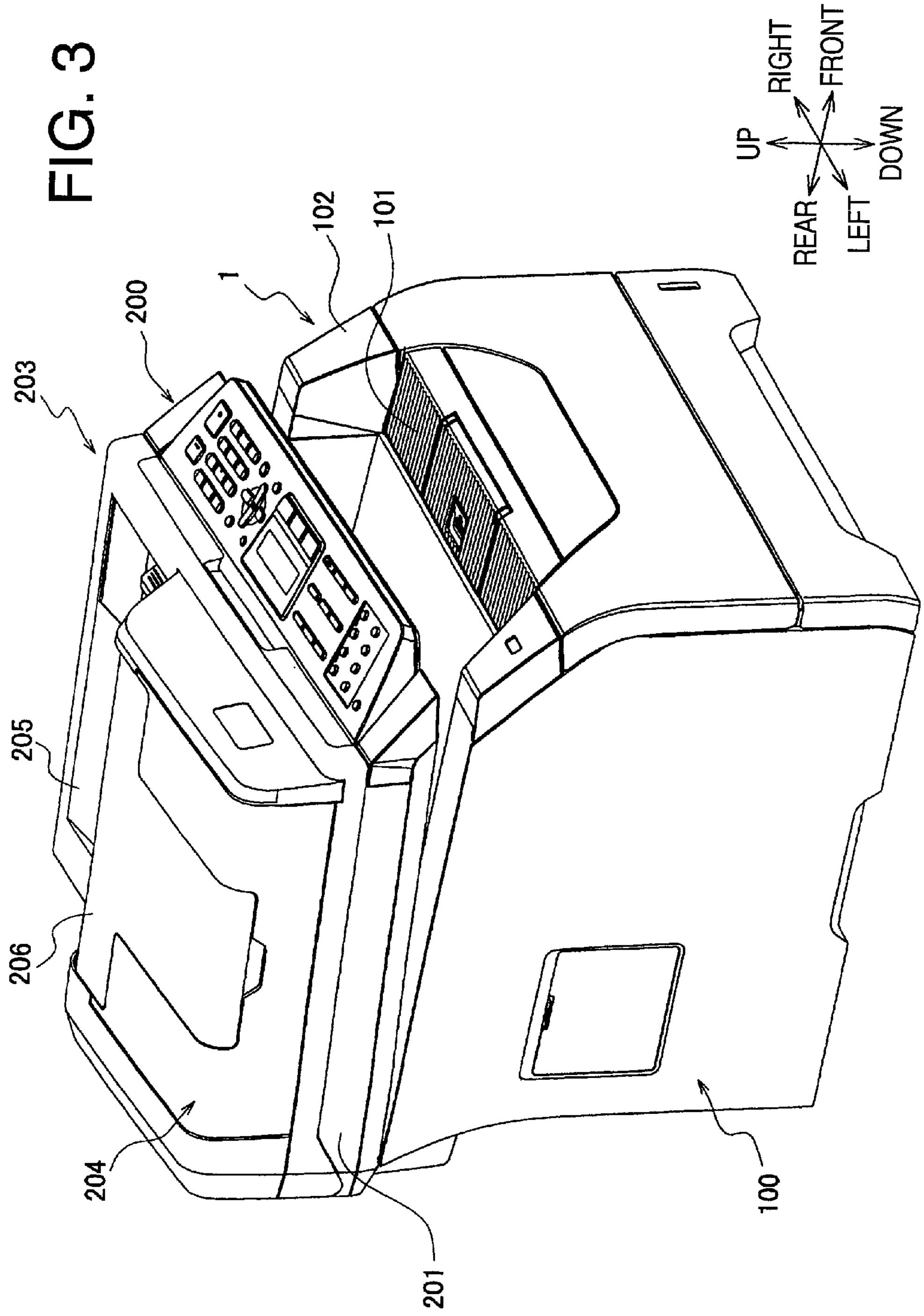
FIG. 3 is a perspective view showing an overall configuration of the image forming device in a state where a scanning unit thereof is opened in the embodiment according to one or more aspects of the present invention.

The scanning unit 200 is attached to the top cover 102 of the printing unit 100 so as to be swingable between a closed position where the upper side of the printing unit 100 is closed as shown in FIG. 1 and an opened position where the upper side of the printing unit 100 is opened as shown in FIG. 3.

Figure 6:
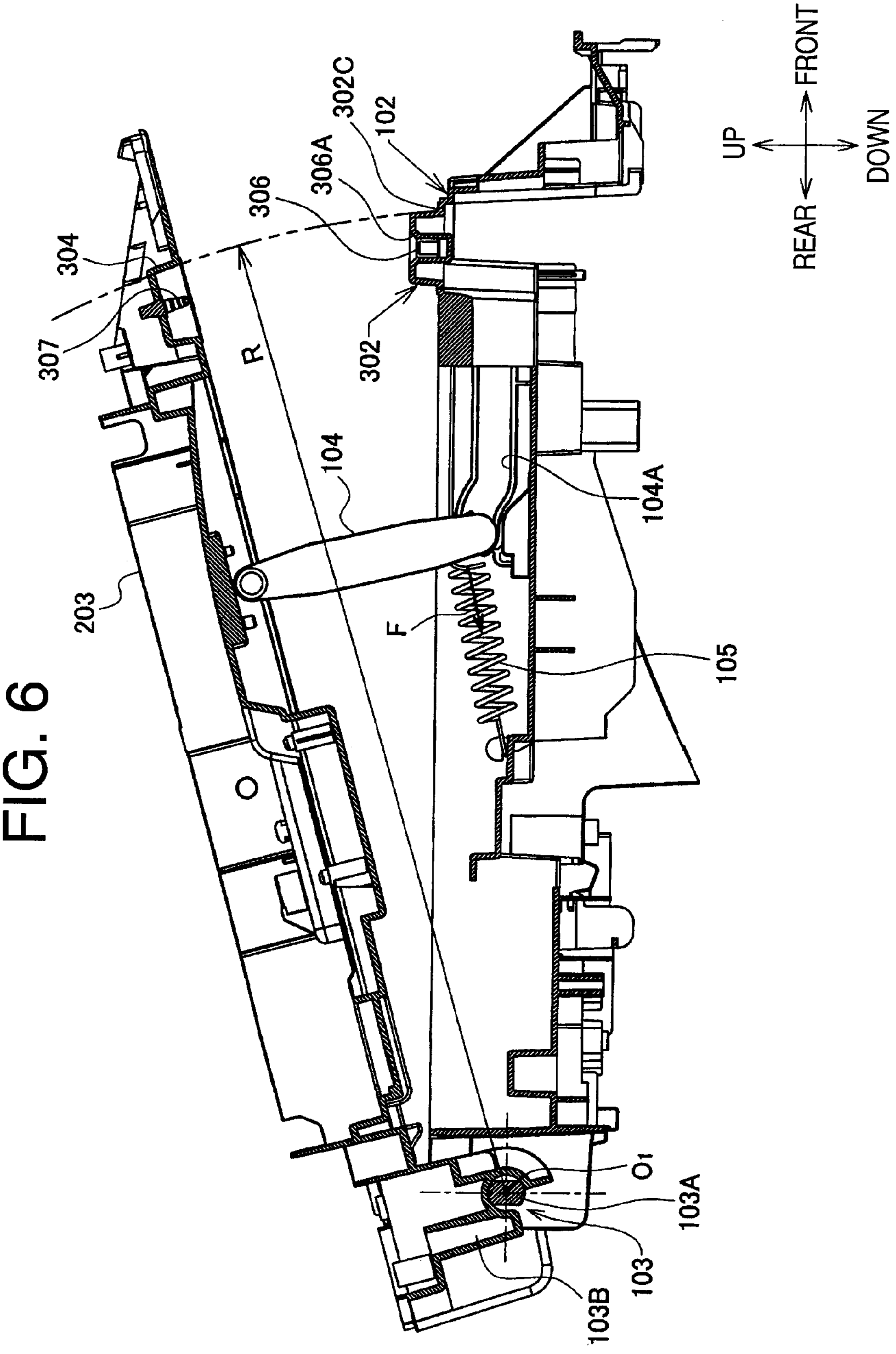
FIG. 6 is a side view showing a framework configuration of the image forming device in the state where the document table is set in the opened position relative to the top cover in the embodiment according to one or more aspects of the present invention.

Specifically, the document table 201 is attached to the top cover 102 to be swingable via hinge mechanisms 103 at the same sides (at the rear side in the embodiment) as the hinges 203A for the document cover 203, as shown in FIG. 6. Each of the hinge mechanisms 103 includes a swing shaft 103A provided to the top cover 102 and a substantially C-shaped engagement section 103B which is attached rotatably relative to the swing shaft 103A.

It is noted that in the embodiment, the hinge mechanisms 103 are provided in two respective positions of the top cover 102 along an axial direction (in the left-to-right direction in the embodiment) of the swing shaft 103A. Further, as illustrated in FIG. 6, arms 104 for holding the document table 201 are provided in respective positions, which are away from the hinge mechanisms 103 along a direction (frontward in the embodiment) perpendicular to the axial direction of the swing shafts 103A. One end of each of the arms 104 is swingably attached to the document table 201, while the other end is attached to the top cover 102 via a guide groove 104A movably in the front-to-rear direction.

Further, the other end of each of the arms 104 is connected with a spring 105, which applies to the other end of each of the arms 104 an elastic force F directed toward (a corresponding one of) the hinge mechanisms 103. Therefore, in the closed position, the elastic forces F are applied to the arms 104 in such a direction as to restrain the scanning unit 200 from being displaced farther from a swing center O1 of the scanning unit 200. Further, in the opened position, the elastic forces F are applied to the arms 104 so as to hold the arms 104 in predetermined positions.

Figure 8:
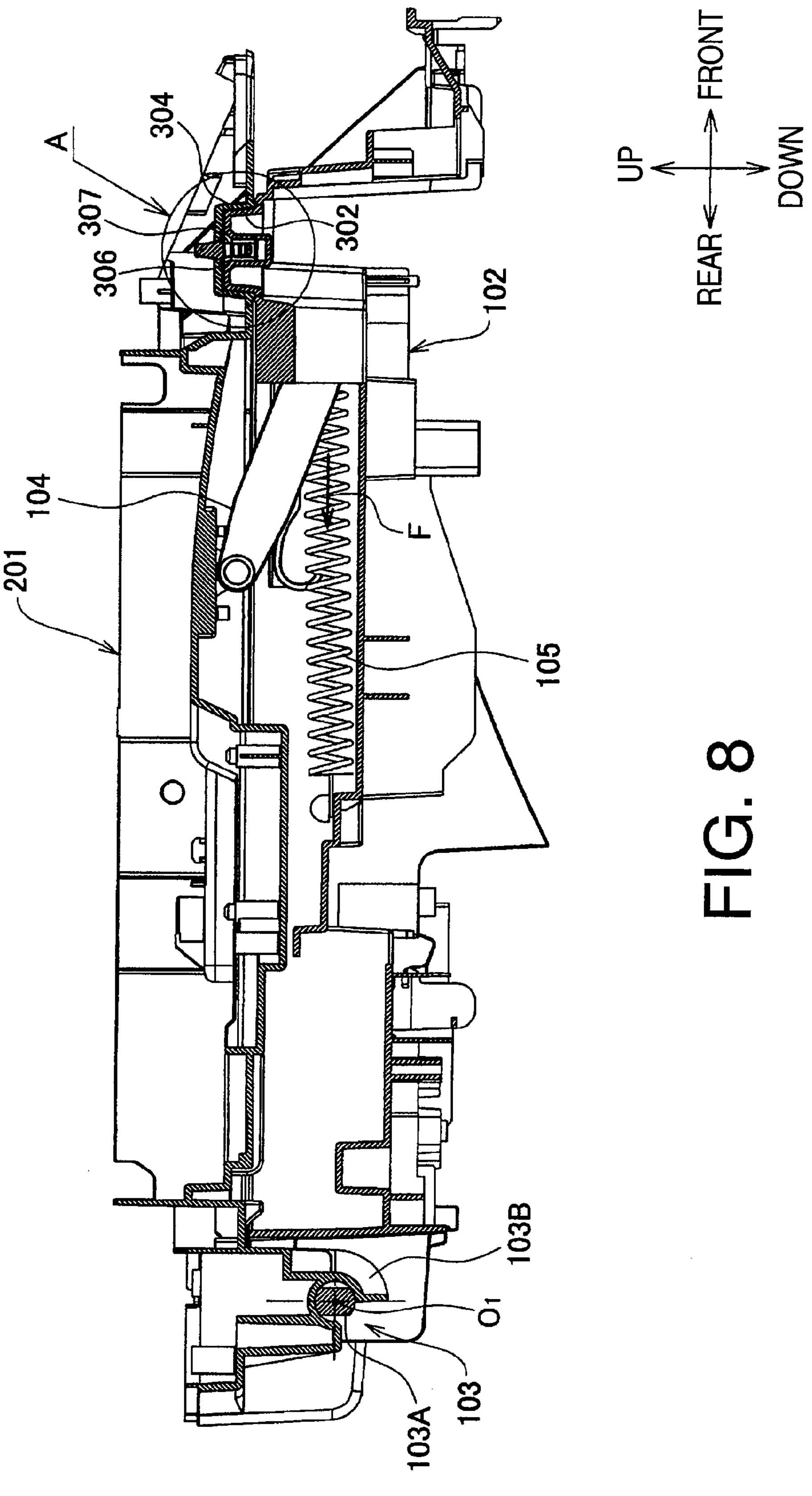
FIG. 8 is a side view showing a framework configuration of the image forming device in a state where the document table is set in the closed position relative to the top cover in the embodiment according to one or more aspects of the present invention.

Namely, since the elastic force F of each spring 105 is directed from the other end of the arm 104 toward the hinge mechanism 103. Therefore, in the closed position, as shown in FIG. 8, a longitudinal direction of the arm 104 comes to be more parallel to the direction of the elastic force F, and the one end of the arm 104 (i.e., the joint with the document table) is located closer to the hinge mechanism 103 than the other end of the arm 104. Thus, the document table 201 is urged by the elastic force F toward the hinge mechanism 103.

Further, in the opened position, as illustrated in FIG. 6, the other end of each arm 104 is pressed by the elastic force F against an end of the guide groove 104A at the hinge mechanism 103 side. Thus, the other end of the arm 104 is regulated with respect to the position thereof, and held in a predetermined position so as to maintain the opened position.

When a sheet to be printed has a small size, the printed sheet is ejected at the hinge mechanism 103 side (the rear side in the embodiment) on the catch tray 101. When the scanning unit 200 is in the closed position, the catch tray 101 has the upper side thereof covered with the scanning unit 200 as shown in FIG. 1. Hence, it may be difficult to take out the printed sheet placed at the rear side on the catch tray 101.

However, in the image forming device 1 of the embodiment, the scanning unit 200 is swingable relative to (the top cover 102 of) the printing unit 100. Therefore, when the scanning unit 200 is set into the opened position, the upper side of the catch tray 101 is opened. Thus, even though the printed sheet is placed at the rear side on the catch tray 101, it is possible to easily take out the printed sheet.

When document reading is performed with the static-document reading function, as described above, the user is required to open the document cover 203 up and place a document sheet on the first reading window 202A. However, the document table 201 may be swung as well toward the opened position by an operation force applied for opening the document cover 203.

Figure 10A:
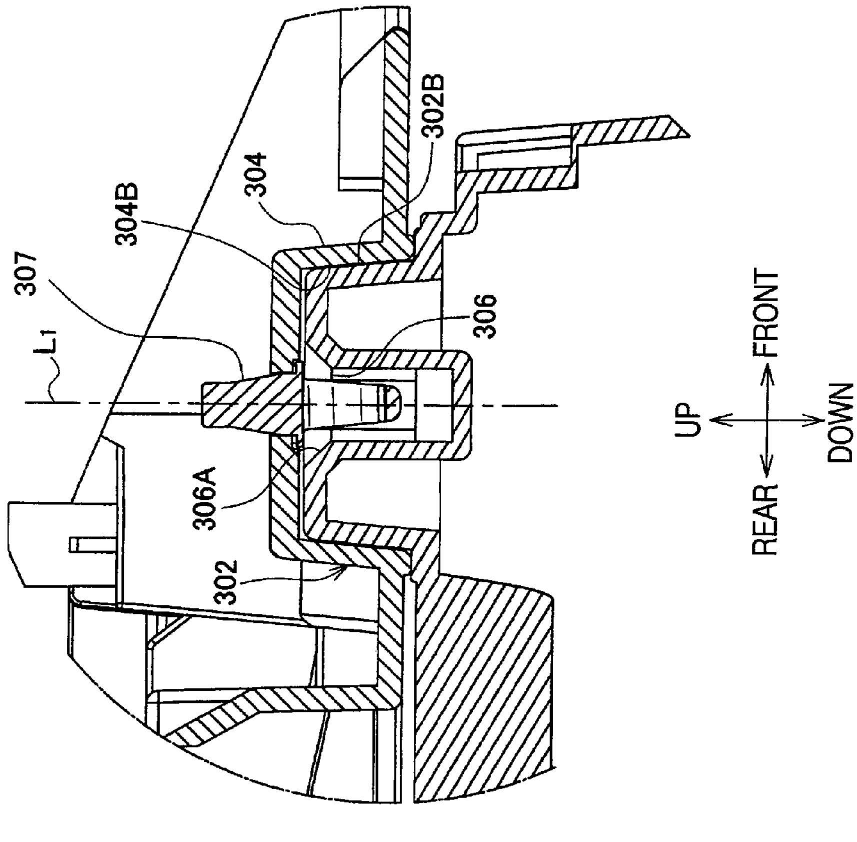
FIG. 10A is an enlarged side view of the portion A shown in FIG. 8 in the embodiment according to one or more aspects of the present invention.
Figure 10B:
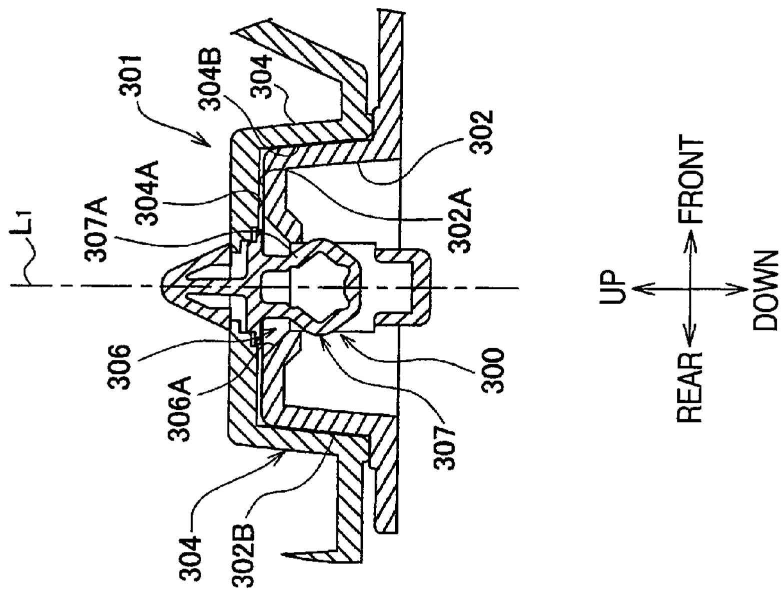
FIG. 10B is an enlarged front view of the portion A shown in FIG. 8 in the embodiment according to one or more aspects of the present invention.

In consideration of the above situation, the image forming device 1 of the embodiment has a lock mechanism 300 (see FIG. 10B) and a positioning mechanism 301 (see FIG. 10B). The lock mechanism 300 is configured to prevent the scanning unit 200 from swinging to open when the user operates the scanning unit 200. Further, the positioning mechanism 301 is configured to position the scanning unit 200 relative to the printing unit 100.

2. Configurations of Lock Mechanism and Positioning Mechanism

Figure 4:
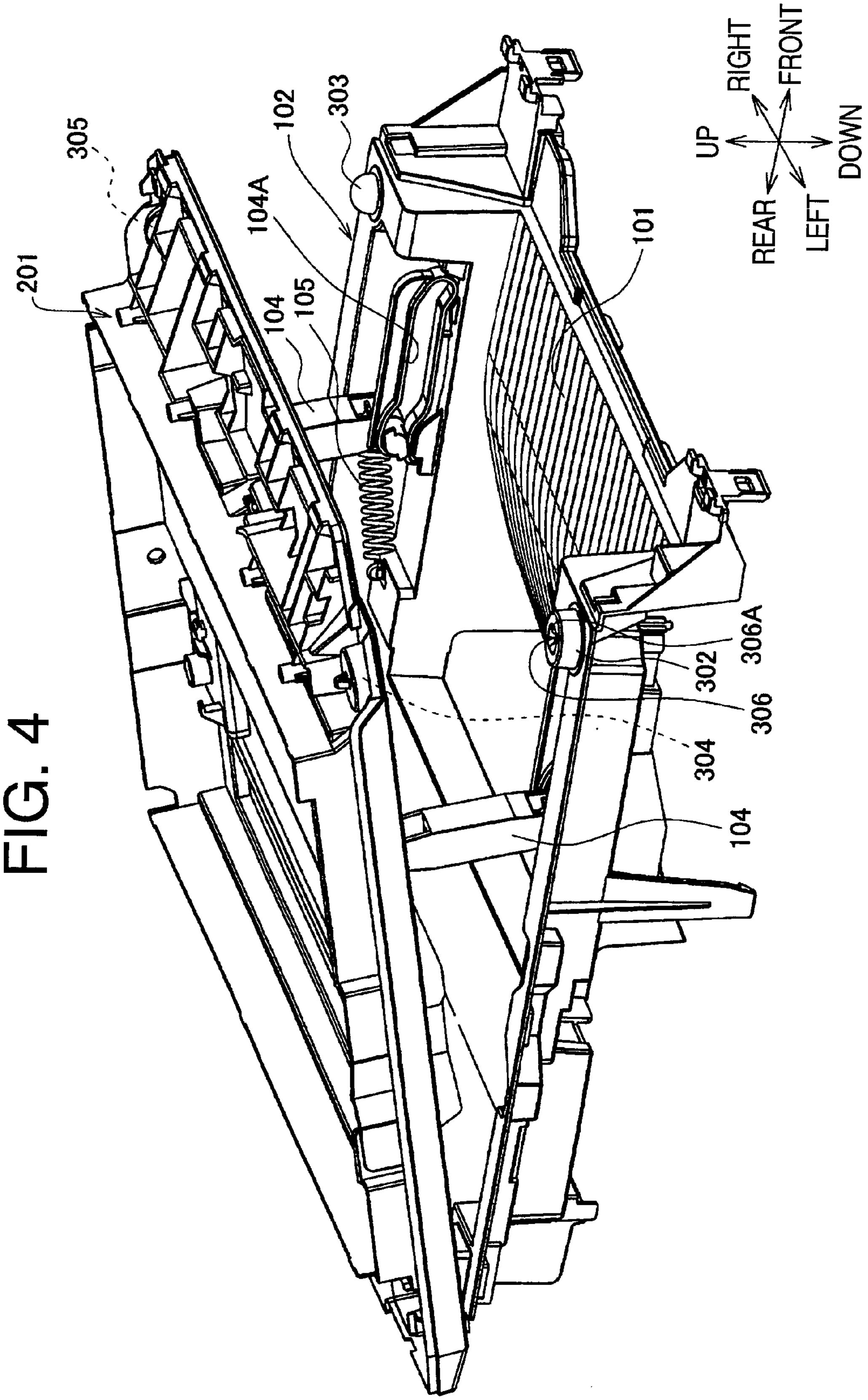
FIG. 4 is a perspective view showing a framework configuration of the image forming device in a state where a document table is set in an opened position relative to a top cover in the embodiment according to one or more aspects of the present invention.

As illustrated in FIG. 4, the positioning mechanism 301 includes protruding sections 302 and 303 provided to (the top cover 102 of) the printing unit 100 and recessed sections 304 and 305 provided to (the document table 201 of) the scanning unit 200.

The protruding sections 302 and 303 protrude from the upper surface of the top cover 102 toward (the document table 201 of) the scanning unit 200. The recessed sections 304 and 305 are recessed from the lower surface of the document table 201 (a surface facing the top cover 102), in a direction in which the protruding sections 302 and 303 protrude (upward in the embodiment). With respective engagements between the protruding sections 302 and 303 and the recessed sections 304 and 305 in the closed position, the scanning unit 200 is positioned relative to the printing unit 100.

In the positioning mechanism 301 of the embodiment, a first engagement pair of the protruding section 302 and the recessed section 304 and a second engagement pair of the protruding section 303 and the recessed section 305 are disposed at the left and right sides, respectively, at the front side relative to the swing shafts 103A via the catch tray 101, so as to face each other across the catch tray 101.

The first engagement pair of the protruding section 302 and the recessed section 304 is provided with the lock mechanism 300. Meanwhile, the second engagement pair of the protruding section 303 and the recessed section 305 is not provided with any lock mechanism. In the second engagement pair, the protruding section 303 and the recessed section 305 are formed in dome shapes, respectively.

Figure 5:
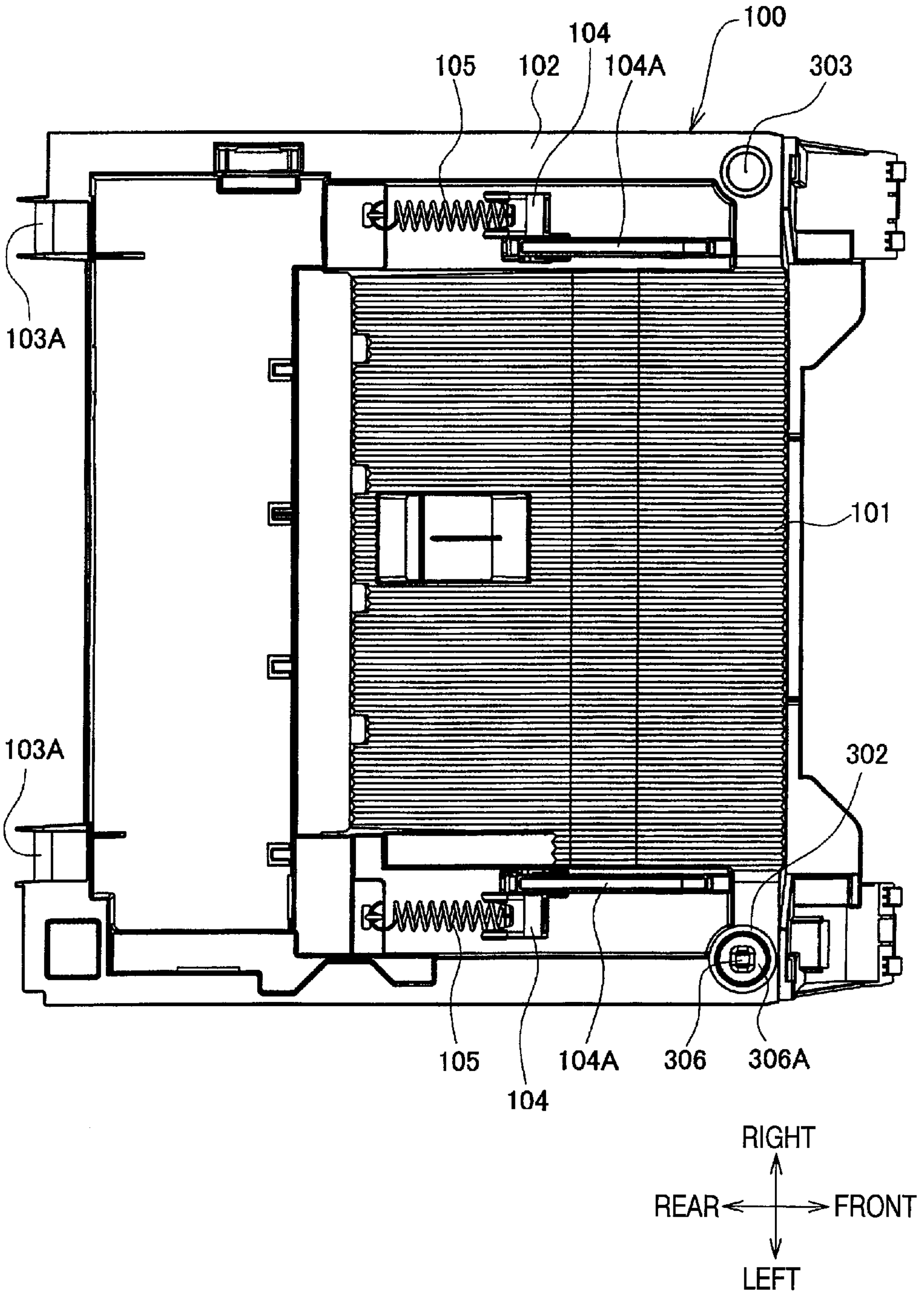
FIG. 5 is a top of a printing unit of the image forming device in the embodiment according to one or more aspects of the present invention.

Further, as shown in FIG. 6, a side wall 302B of the protruding section 302 is formed in an arc shape defined with a curvature radius R around the swing center O1, when viewed in the axial direction of the swing shaft 103A (the left-to-right direction in the embodiment). It is noted that the curvature radius R is a distance between the swing center O1 and a front-end root of the protruding section 302. Additionally, as illustrated in FIGS. 4 and 5, the side wall 302B of the protruding section 302 is formed in a rotational symmetry shape with respect to a central axis L1 (see FIG. 10A) parallel to the protruding direction thereof.

Further, as shown in FIG. 6, the swing center O1 of the scanning unit 200 is disposed to be lower than a lower end 302C of the protruding section 302. Therefore, the protruding section 302 is formed substantially in such a tapered conical shape that an outer shape dimension W1 (see FIG. 9A) thereof in a direction perpendicular to the central axis L1 is reduced from the lower end 302C (the root side) thereof toward a distal end 302A thereof.

On the other hand, an inner wall 304B of the recessed section 304 is formed in an analogous shape to the side wall 302B of the protruding section 302, i.e., with substantially the same dimensions as those of the side wall 302B of the protruding section 302. In other words, as shown in FIG. 6, the inner wall 304B of the recessed section 304 is as well formed in an arc shape defined with the curvature radius R around the swing center O1, when viewed in the axial direction of the swing shaft 103A (the left-to-right direction in the embodiment). Additionally, the inner wall 304B of the recessed section 304 is formed in a rotational symmetry shape with respect to the central axis L1 (see FIG. 10A) parallel to the recessed direction thereof.

Therefore, the recessed section 304 is formed substantially in such a tapered conical shape that an outer shape dimension W2 (see FIG. 9A) thereof in a direction perpendicular to the central axis L1 increases from a bottom 304A thereof toward the open side thereof.

Figure 9B:
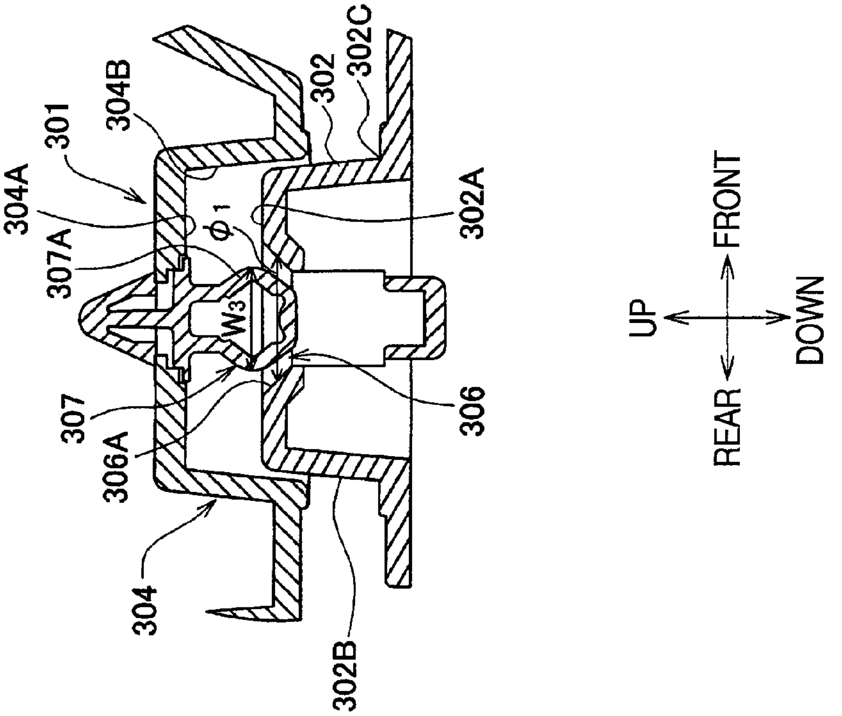
FIG. 9B is an enlarged front view of the portion A shown in FIG. 7 in the embodiment according to one or more aspects of the present invention.
Figure 9A:
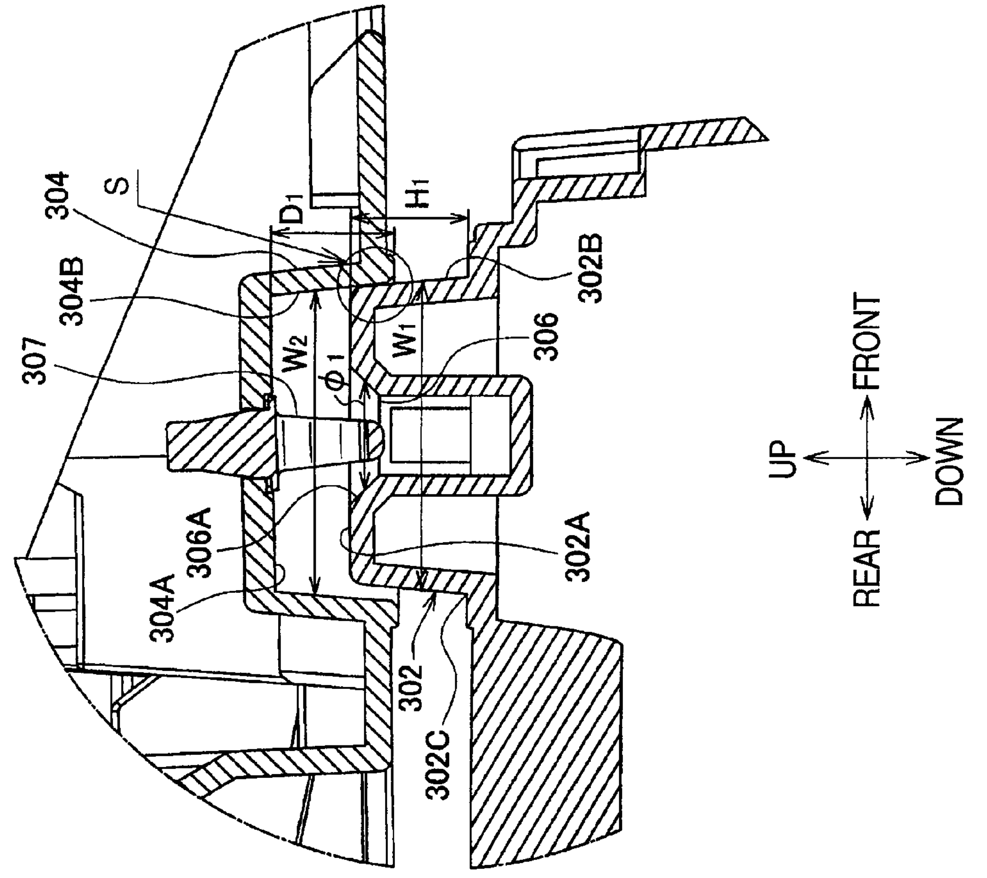
FIG. 9A is an enlarged side view of a portion A shown in FIG. 7 in the embodiment according to one or more aspects of the present invention.

In addition, as shown in FIGS. 9A and 9B, the lock mechanism 300 includes an engagement hole 306 provided to the distal end 302A of the protruding section 302 and an elastically deformable engagement portion 307 provided to the bottom 304A of the recessed section 304.

The engagement hole 306 has a tapered portion 306A formed therearound in such a cone shape that a hole diameter $\phi$1 is reduced from the distal end 302A toward the lower end 302C of the protruding section 302. Meanwhile, as illustrated in FIGS. 9B and 10B, the engagement portion 307 is formed substantially in a pantograph shape with an elastically-deformable lozenge-shaped portion 307A.

The lozenge-shaped portion 307A is configured to elastically deform so as to open and close in a direction (the left-to-right direction in the embodiment) parallel to the axial direction of the swing shaft 103A. When the lozenge-shaped portion 307A is engaged with the engagement hole 306 as shown in FIG. 10B, engagement between the engagement portion 307 and the engagement hole 306 is established.

Therefore, when the scanning unit 200 is swung from the opened position to the closed position, i.e, when the scanning unit 200 is being closed, as shown in FIG. 9B, the lozenge-shaped portion 307A is elastically narrowed down while being guided by the tapered portion 306A. Consequently, a dimension W3 of the lozenge-shaped portion 307A in the left-to-right direction is reduced.

Then, when the scanning unit 200 is set in the closed position, the lozenge-shaped portion 307A passes through the engagement hole 306, and the dimension W3 of the lozenge-shaped portion 307A in the left-to-right direction is restored to the original dimension in an elastically expanded manner. Thereby, as illustrated in FIG. 10B, the engagement portion is adequately engaged with the engagement hole 306, so as to maintain the closed position of the scanning unit 200.

Further, the inner wall 304B of the recessed section 304 is formed in an analogous shape to the side wall 302B of the protruding section 302, with substantially the same dimensions as those of the side wall 302B of the protruding section 302. Therefore, when the protruding section 302 is fitted into the recessed section 304, and the side wall 302B of the protruding section 302 contacts the inner wall 304B of the recessed section 304, the scanning unit 200 is positioned relative to the printing unit 100 without so greatly jouncing, as illustrated in FIG. 8.

Further, in the embodiment, when the scanning unit 200 is swung from the opened position to the closed position, the side wall 302B of the protruding section 302 comes into contact with the inner wall 304B of the recessed section 304 before the engagement portion 307 contacts the engagement hole 306 or surrounding portions (e.g., the tapered portion 306A).

Specifically, a height H1 of the side wall 302B and a depth D1 of the inner wall 304B are set such that when the scanning unit 200 is swung from the opened position to the closed position, as shown in FIG. 9A, a side wall portion S of the side wall 302B comes into first contact with a portion of the inner wall 304B that faces the side wall portion S. It is noted that the side wall portion S of the side wall 302B is located at the side of the distal end of the protruding section 302, opposite the hinge mechanism 103.

When the side wall 302B contacts the inner wall 304B, the scanning unit 200 is positioned relative to the printing unit 100 without so greatly jouncing. Then, while maintaining the state where the scanning unit 200 is positioned relative to the printing unit 100, the scanning unit 200 is swung. Thereafter, lozenge-shaped portion 307A is elastically deformed while being guided in contact with the tapered portion 306A, and thus the engagement between the engagement portion 307 and the engagement hole 306 is completely established (see FIGS. 10A and 10B).

It is noted that since the scanning unit 200 is configured to swing around the swing center O1, contact between the side wall 302B and the inner wall 304B is not generally established in the direction parallel to the axial direction of the swing shaft 103A, as shown in FIG. 9B. However, the contact between the side wall 302B and the inner wall 304B may be established in the direction parallel to the axial direction of the swing shaft 103A, depending on dimensional variations therebetween.

3. Features of Image Forming Device

In the embodiment, as described above, when the scanning unit 200 is swung from the opened position to the closed position, the side wall 302B of the protruding section 302 comes into contact with the inner wall 304B of the recessed section 304 before the engagement portion 307 contacts the engagement hole 306 or surrounding portions. Therefore, an impulsive force is received by a contact portion between the side wall 302B and the inner wall 304B when the scanning unit 200 is swung from the opened position to the closed position. Accordingly, an impulsive force applied to the engagement portion 307 can be reduced, and thus it is possible to restrain the engagement portion 307 from being damaged.

Figure 7:
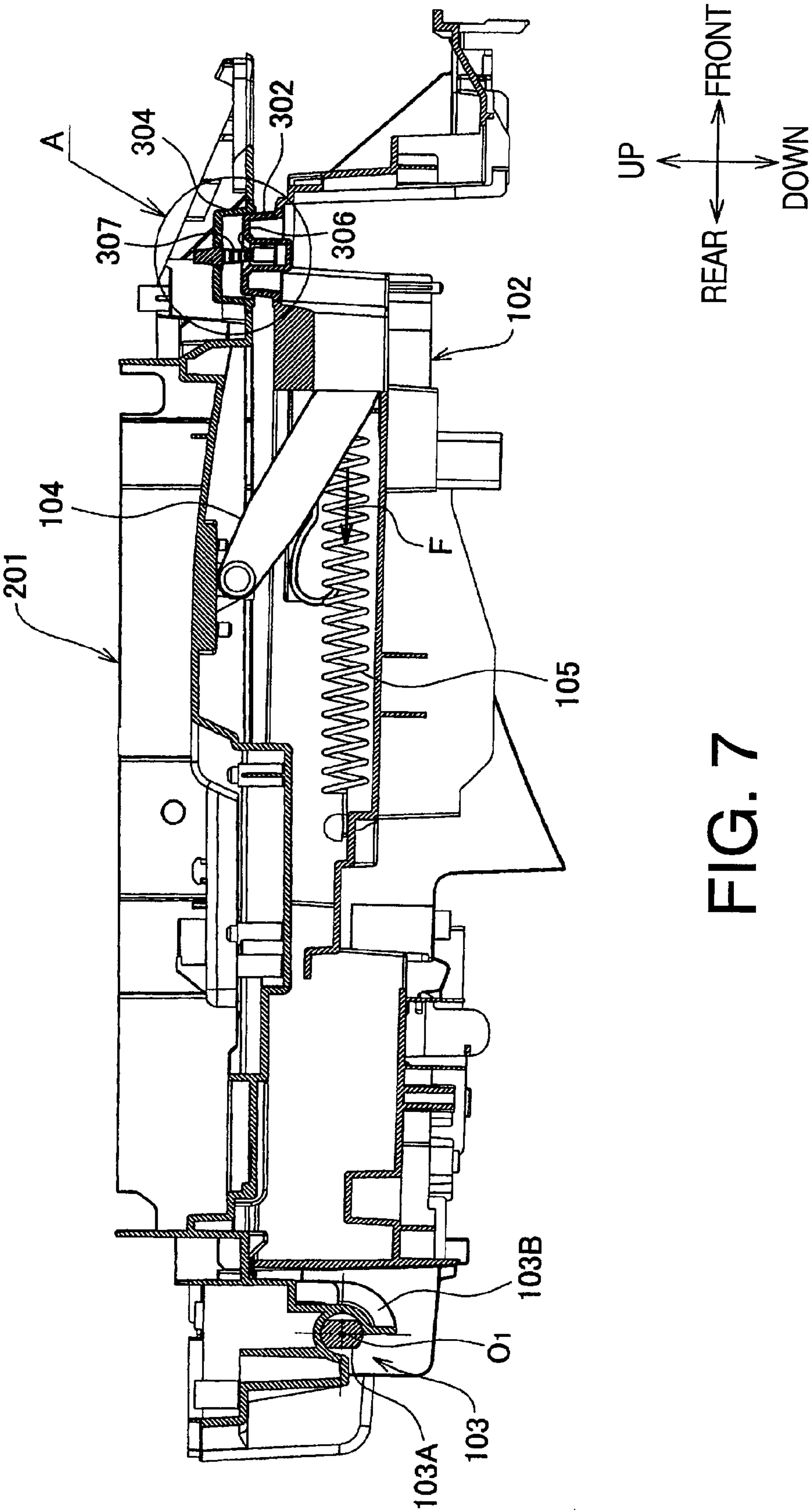
FIG. 7 is a side view showing a framework configuration of the image forming device in a state where the document table is swung into a closed position relative to the top cover in the embodiment according to one or more aspects of the present invention.

Further, in the embodiment, at least the following two portions are formed in an arc shape defined with the curvature radius R around the swing center O1 of the scanning unit 200, as shown in FIGS. 6 and 7. One of the two portions is a portion, of the inner wall 304B of the recessed section 304, which contacts the side wall 302B of the protruding section 302 when the scanning unit 200 is swung from the opened position to the closed position. The other is a portion, of the side wall 302B, which comes into first contact with the inner wall 304B when the scanning unit 200 is swung from the opened position to the closed position. Therefore, it is possible to displace the recessed section 304 relative to the protruding section 302 smoothly while letting the side wall 302B contact the inner wall 304B.

Accordingly, it is possible to make the side wall 302B of the protruding section 302 and the inner wall 304B of the recessed section 304 serve as guiders for establishing the engagement between the protruding section 302 and the recessed section 304. Hence, in the embodiment, it is not required to prepare separate guiders, and thus it is possible to prevent a protruding dimension of the protruding section 302 and a recessed dimension of the recessed section 304 from increasing.

Further, in the embodiment, the side wall 302B of the protruding section 302 and the inner wall 304B of the recessed section 304 are formed in a rotational symmetry shape with respect to the central axis L1. Therefore, it is possible to easily perform resin forming for the protruding section 302 and the recessed section 304.

Additionally, in the embodiment, owing to the springs 105, it is possible to prevent the scanning unit 200 from being displaced to be farther from the swing center O1. Therefore, when the scanning unit 200 is swung from the opened position to the closed position, it is possible to certainly make the side wall portion S, which is the farthest portion of the side wall 302B from the swing center O1, contact the farthest portion of the inner wall 304B from the swing center O1. Accordingly, it is possible to fit the protruding section 302 smoothly into the recessed section 304, and thus to position the scanning unit 200 in an easy and certain manner.

Moreover, in the embodiment, the swing center O1 of the scanning unit 200 is disposed to be lower than the lower end 302C of the protruding section 302. Therefore, it is possible to form each overall outer shape of the protruding section 302 and the recessed section 304 substantially in such a tapered shape that the outer shape dimension thereof is increased from the opened position toward the closed position, as shown in FIGS. 7 and 8. Accordingly, it is possible to guide the protruding section 302 into the recessed portion 304 such that the protruding section 302 is certainly fitted into the recessed section 304.

Further, in the embodiment, the engagement portion 307 has the lozenge-shaped portion 307A configured to be elastically deformed so as to open and close in the left-to-right direction parallel to the axial direction of the swing shaft 103A of the scanning unit 200. Therefore, as illustrated in FIG. 10B, the engagement portion 307 is configured to engage with the engagement hole 306 in two positions in the left-to-right direction parallel to the axial direction of the swing shaft 103A.

Therefore, when the scanning unit 200 is swung from the opened position to the closed position, it is possible to cause two L-shaped engagement segments provided at both the left and right sides of the lozenge-shaped portion 307A to contact the engagement hole 306 substantially at the same time. Accordingly, it is possible to prevent a great impulsive force from being applied to only one of the two engagement segments, and thus to prevent the engagement portion 307 from being damaged early.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible.

In the aforementioned embodiment, the protruding section 302 and the recessed section 304 are formed in a rotational symmetry shape. However, the protruding section 302 and the recessed section 304 may be formed in any other shape.

Further, in the aforementioned embodiment, the protruding sections 302 and 303 are provided to the top cover 102, and the recessed sections 304 and 305 are provided to the document table 201. However, the protruding sections 302 and 303 may be provided to the document table 201, and the recessed sections 304 and 305 may be provided to the top cover 102.

Further, in the aforementioned embodiment, the engagement portion 307 is provided to the recessed section 304, and the engagement hole 306 is provided to the protruding section 302. However, the engagement portion 307 may be provided to the protruding section 302, and the engagement hole 306 is provided to the recessed section 304.

Further, in the aforementioned embodiment, the positioning mechanism 301 includes the first engagement pair of the protruding section 302 and the recessed section 304 and the second engagement pair of the protruding section 303 and the recessed section 305, which pairs are disposed at the left and right sides, respectively, so as to face each other across the catch tray 101. However, the second engagement pair of the protruding section 303 and the recessed section 305 may be omitted.

Further, in the aforementioned embodiment, the engagement portion 307 is formed substantially in a pantograph shape with the elastically-deformable lozenge-shaped portion 307A. However, the engagement portion 307 may be formed in any other shape.

What is claimed is:

1. An image forming device comprising:

a printer configured to form an image on a recording sheet and eject, onto a catch tray thereof, the recording sheet on which the image is formed;

a scanner configured to read an image on a document sheet, the scanner being swingable around a swing central axis relative to the printer between:

a closed position to close and cover an upper side of the catch tray; and an opened position to open the upper side of the catch tray;

a positioning mechanism comprising:

a protruding section formed at one of the printer and the scanner so as to protrude in a protruding direction; and a recessed section formed at a different one of the printer and the scanner so as to be recessed in a recessed direction, wherein the protruding section is configured to be fitted into the recessed section when the scanner is in the closed position;

a lock mechanism comprising:

an engagement hole formed at one of a distal end of the protruding section and a bottom of the recessed section; and an engagement portion formed at a different one of the distal end of the protruding section and the bottom of the recessed section, wherein the engagement hole and the engagement portion are configured to hold the closed position of the scanner by engagement therebetween;

a first contact portion provided to the protruding section; and a second contact portion provided to the recessed section, wherein the first contact portion is configured to, when the scanner is swung from the opened position to the closed position, come into contact with the second contact portion before the engagement portion contacts the engagement hole or a region around the engagement hole.

2. The image forming device according to claim 1, wherein the first contact portion is provided to an outer side wall of the protruding section, wherein the second contact portion is provided to an inner side wall of the recessed section, and wherein each of the first contact portion and the second contact portion is formed in an arc shape with a predetermined radius around the swing central axis of the scanner when viewed in a direction parallel to the swing central axis.

3. The image forming device according to claim 2, wherein the protruding section is configured with the outer side wall formed in a rotational symmetry shape with respect to a central axis parallel to the protruding direction, and wherein the recessed section is configured with the inner side wall formed in a rotational symmetry shape with respect to a central axis parallel to the recessed direction.

4. The image forming device according to claim 3, further comprising an elastic member configured to apply, to the scanner, an elastic force that restrains the scanner from being displaced so as to be farther from the swing central axis of the scanner.

5. The image forming device according to claim 4, wherein the swing central axis of the scanner is disposed lower than a lower end of the protruding section.

6. The image forming device according to claim 1, wherein the protruding section is configured with an outer side wall formed in a rotational symmetry shape with respect to a central axis parallel to the protruding direction, and wherein the recessed section is configured with an inner side wall formed in a rotational symmetry shape with respect to a central axis parallel to the recessed direction.

7. The image forming device according to claim 1, further comprising an elastic member configured to apply, to the scanner, an elastic force that restrains the scanner from being displaced so as to be farther from the swing central axis of the scanner.

8. The image forming device according to claim 1, wherein the swing central axis of the scanner is disposed lower than a lower end of the protruding section.

9. The image forming device according to claim 1, wherein the engagement portion is configured to be elastically deformed so as to open and close in a direction parallel to the swing central axis of the scanner.

10. The image forming device according to claim 9, wherein the engagement portion is formed in a pantograph shape.

11. An image forming device comprising:

a printer configured to form an image on a recording sheet and eject, onto a catch tray thereof, the recording sheet on which the image is formed;

a scanner configured to read an image on a document sheet, the scanner being swingable relative to the printer around a swing central axis disposed lower than a lower end of the protruding section, between:

a closed position to close and cover an upper side of the catch tray; and an opened position to open the upper side of the catch tray;

a positioning mechanism comprising:

a protruding section formed at the printer so as to protrude in a protruding direction; and a recessed section formed at the scanner so as to be recessed in a recessed direction, wherein the protruding section is configured to be fitted into the recessed section when the scanner is in the closed position;

a lock mechanism comprising:

an engagement hole formed at a distal end of the protruding section; and an engagement portion formed at a bottom of the recessed section, wherein the engagement hole and the engagement portion are configured to hold the closed position of the scanner by engagement therebetween;

a first contact portion provided to an outer side wall of the protruding section, the outer side wall being formed in a rotational symmetry shape with respect to a central axis parallel to the protruding direction; and a second contact portion provided to an inner side wall of the recessed section, the inner side wall being formed in a rotational symmetry shape with respect to a central axis parallel to the recessed direction, wherein each of the first contact portion and the second contact portion is formed in an arc shape with a predetermined radius around the swing central axis of the scanner when viewed in a direction parallel to the swing central axis, and wherein the first contact portion is configured to, when the scanner is swung from the opened position to the closed position, come into contact with the second contact portion before the engagement portion contacts the engagement hole or a region around the engagement hole.

* * * * *